United States Patent
Owen et al.

[15] 3,675,162
[45] July 4, 1972

[54] MODULATOR FOR INSTRUMENT LANDING SYSTEM

[72] Inventors: James Neal Owen, Shawnee, Kans.; Raymond Ronald Moberly, Liberty, Mo.; Edwin J. Martin, Jr., Kansas City, Mo.; Akemichi Yamada, Raytown, Mo.; Edmund C. Thomas, Kansas City, Kans.

[73] Assignee: Wilcox Electric, Inc.

[22] Filed: July 15, 1970

[21] Appl. No.: 55,102

[52] U.S. Cl..............................332/23, 325/138, 332/30, 332/44, 343/107
[51] Int. Cl............................................G01s 1/08
[58] Field of Search...................332/42, 30, 44, 45, 48, 16, 332/23; 325/138, 49; 343/109, 107, 108

[56] References Cited

UNITED STATES PATENTS

| | | | |
|---|---|---|---|
| 3,305,866 | 2/1967 | Earp | 343/109 |
| 3,484,786 | 12/1969 | Lattard | 332/44 X |
| 2,697,220 | 12/1954 | Hancock | 343/109 X |
| 2,978,701 | 4/1961 | Pickles | 343/109 X |
| 3,283,326 | 11/1966 | Watts | 343/109 X |
| 3,508,267 | 4/1970 | Villiers | 343/109 |

*Primary Examiner*—Alfred L. Brody
*Attorney*—Hurvitz and Rose

[57] ABSTRACT

A modulator for an instrument landing system includes a source of a radio frequency carrier wave and a first power divider coupling the carrier wave to a first hybrid combining circuit and through a second power divider to first and second constant input impedance audio frequency double sideband suppressed carrier generators with good isolation. The sideband generators are coupled to a second hybrid combining network having a double sideband suppressed carrier difference signal output, constituting a "sideband" output of the modulator, and a double sideband suppressed carrier sum output which is combined with the carrier wave in the first hybrid combining circuit to provide a "carrier wave" output of the modulator. The sideband generators each include a capacitor bridge, and phase shift means are provided so that the signals on one side of the bridge are reversed in phase with respect to signals on the other side thereof. The bridges are each formed by a pair of spaced parallel stator plates having four facing conductive patterns and a motor driven rotor having a plurality of pie-shaped conductive patterns positioned therebetween. The shape and size of the stator conductive patterns, the number of rotor conductive patterns, and the speed of rotation of the rotor are so selected that a sinusoidal audio frequency modulation of the carrier wave is effected.

24 Claims, 14 Drawing Figures

INVENTORS
J. NEAL OWEN
R. RONALD MOBERLY
EDWIN MARTIN, JR
AKEMICHI YAMADA
EDMUND C. THOMAS

BY Hurvitz & Rose
ATTORNEYS

Patented July 4, 1972
3,675,162
6 Sheets-Sheet 3
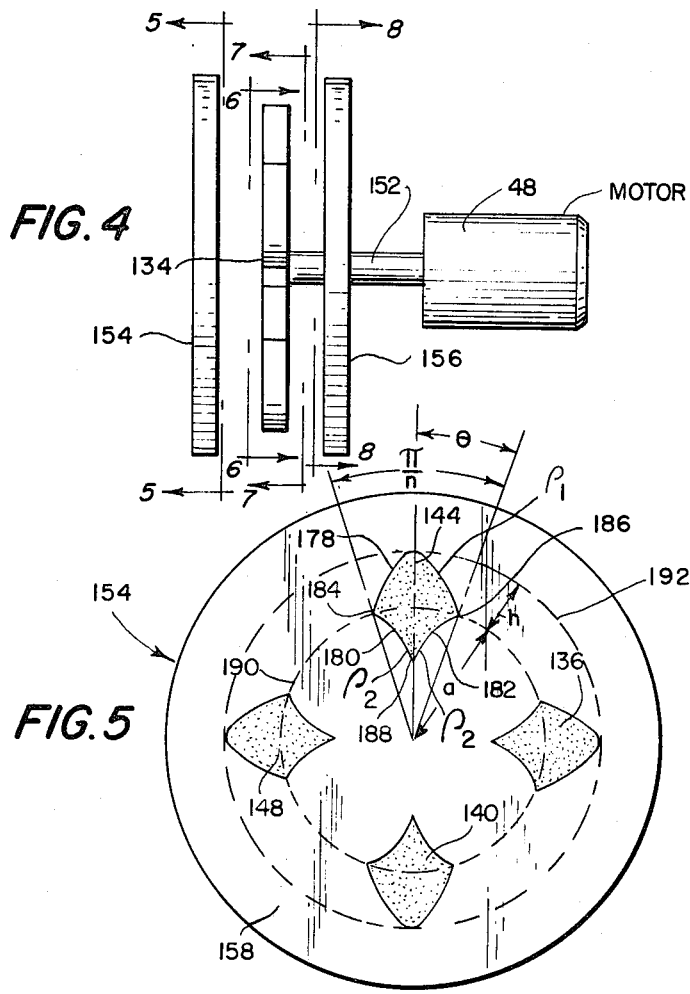
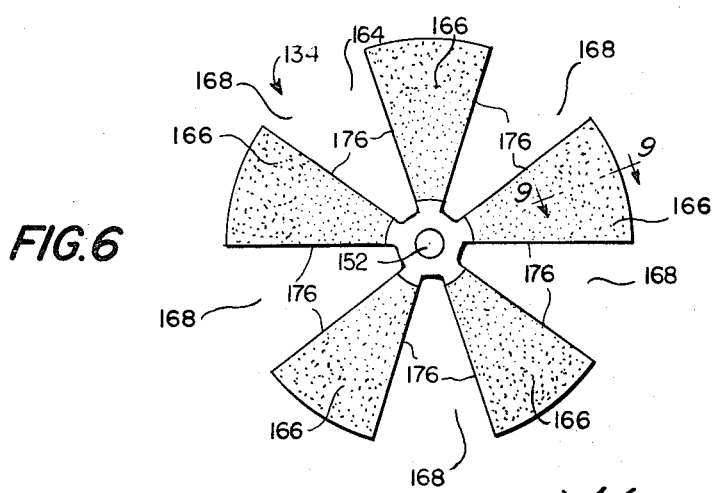
INVENTORS
J. NEAL OWEN
R. RONALD MOBERLY
EDWIN MARTIN, JR.
AKEMICHI YAMADA
EDMUND C. THOMAS
BY Kurntz & Rose
ATTORNEYS

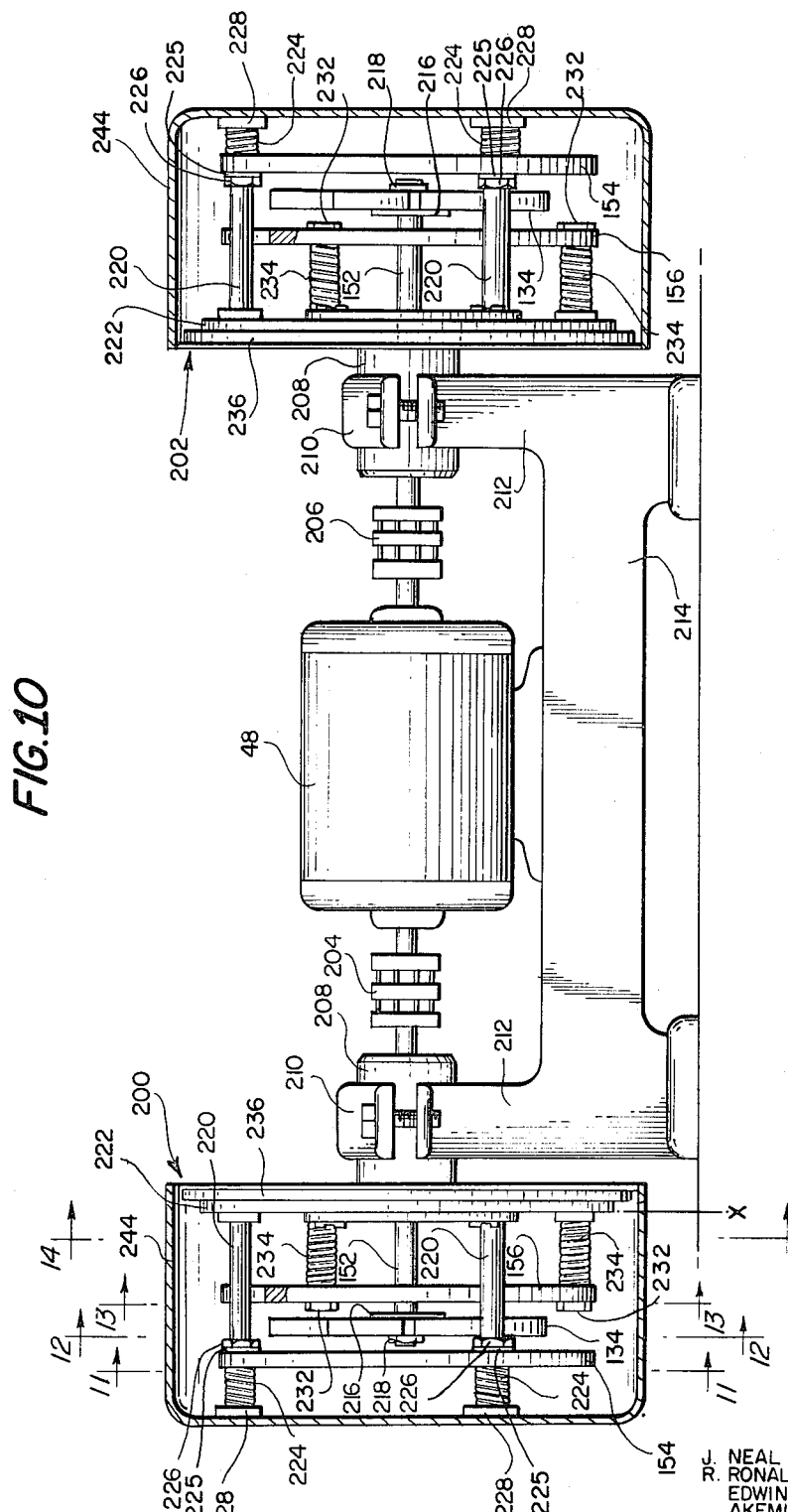

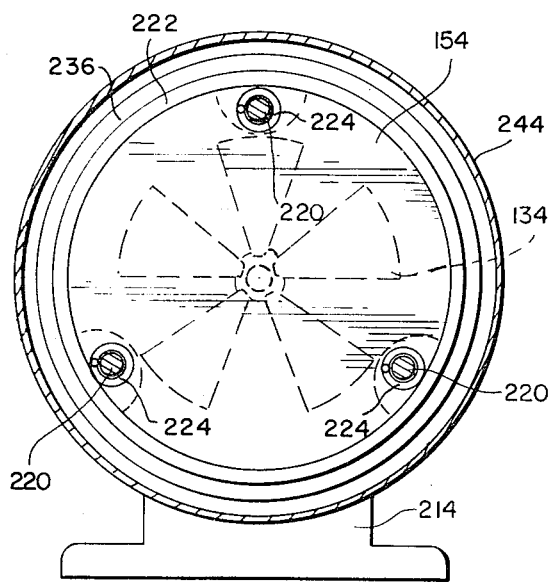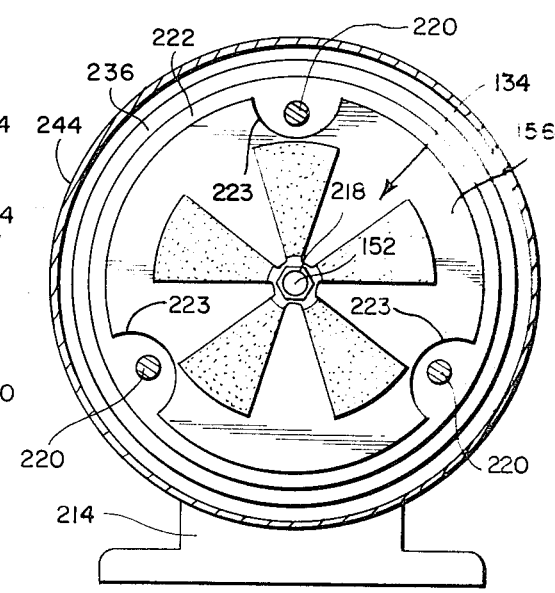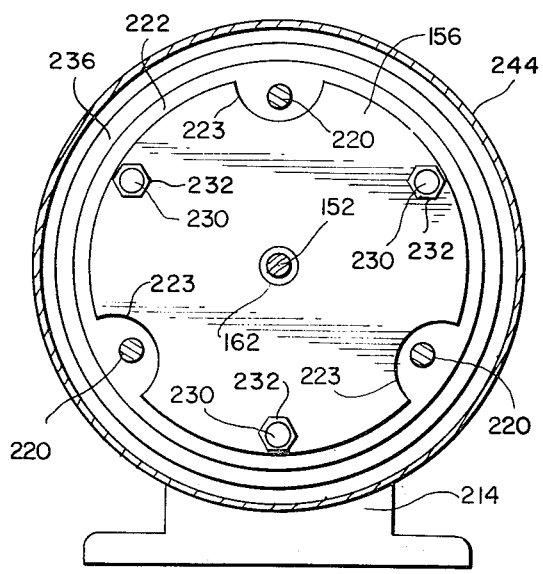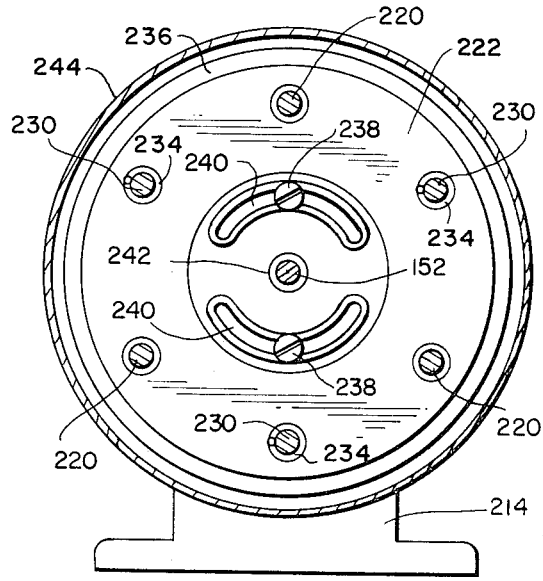

MODULATOR FOR INSTRUMENT LANDING SYSTEM

BACKGROUND OF THE INVENTION

This invention relates to instrument landing systems and more particularly to an improved modulator for instrument landing systems.

Instrument landing systems are widely used for guiding the landing of aircraft. Typically, such systems include a modulator having two sideband generators: one to modulate the carrier wave at 90 Hz., and the other to modulate the carrier wave at 150 Hz. The modulator provides a modulated carrier wave signal to be radiated from an antenna aligned with the guidance path, and double sideband suppressed carrier signals are radiated from oppositely phased antenna on opposite sides of the guidance path, thus providing 90 Hz. and 150 Hz. space modulated RF signals, whose difference in depth of modulation provides guidance to a landing aircraft.

Since the quality of guidance information produced by the modulator of an instrument landing system is directly related to the quality of the guidance information radiated into space, the modulator is one of the most critical components of an instrument landing system. Ideally, the modulator of an instrument landing system should maintain low harmonic distortion of the modulating tones and have low intermodulation products. It should provide for easy, yet adequate, adjustments of the output signals, such as with regard to modulation depth, relative amplitude of its output signals, relative RF phase of its output signals, relative amplitude of its sideband signals, relative RF phase of its sideband signals, and relative audio phase between its sideband signals. Stable output signals should be provided. Moreover, the modulator should be highly reliable, be easily tuned, and provide constant input impedance. Although a number of modulators for instrument landing systems have been proposed in the prior art, almost all of them fall short of at least some of these requirements.

SUMMARY OF THE INVENTION

It is accordingly the principal object of the invention to provide an improved modulator for instrument landing systems and, in particular, a modulator which fulfills the above stated criteria.

It is thus an object of the invention to provide a modulator for an instrument landing system which produces reliable high quality guidance information signals and provides simple and easy, yet adequate, adjustments of its output signals. To this end, it is an object of the invention to provide a multi-path RF network which separates a portion of the incoming unmodulated carrier wave signals from a radio frequency signal source to feed constant input impedance sideband generators and then combines and distributes the modulation components into modulated carrier signals and sideband only signals, respectively, to the two antenna outputs of the instrument landing system with discrete phase and amplitude relationships.

Another object of the invention is the provision of motor driven electro-mechanical constant input impedance sideband generators which produce low audio distortion 90 Hz. and 150 Hz. double sideband suppressed carrier signals.

An additional object of the invention involves the provision of a capacitor bridge assembly including means to vary the capacitance thereof sinusoidally to modulate the carrier wave at a constant audio frequency rate. A related object involves the provision of a capacitor structure having spaced, parallel conductive patterns of such size and configuration that sinusoidal audio frequency modulation of the capacitance is effected when a rotor having conductive patterns is rotated therebetween.

Briefly, the invention contemplates the provision of a multi-path radio frequency network including a first path adapted to receive a radio frequency carrier wave, a first power divider for dividing the power of the carrier wave between a second path and a third path while maintaining good isolation between the second path and the third path, a second power divider for dividing the power of the carrier wave in the third path between a fourth path and a fifth path while maintaining good isolation between the fourth path and the fifth path, a first constant input impedance double sideband suppressed carrier generator in the fourth path, and a second constant input impedance double sideband suppressed carrier generator in the fifth path. The first sideband generator modulates the carrier wave at a first audio frequency (90Hz.), while the second sideband generator modulates the carrier wave at a second audio frequency (150 Hz.). The outputs from the sideband generators are combined in a hybrid combining network providing a double sideband suppressed carrier difference output, as the sideband output of the modulator, and a double sideband suppressed carrier sum output. Another hybrid combining network combines the carrier wave in the second path with the sum output to provide the carrier wave output of the modulator.

Each of these sideband generators comprises an impedance bridge network having motor driven means to vary its impedance at a rate introducing the aforesaid audio frequency modulations. In order to provide the required constant input impedance, the bridge network provides outputs in audio quadrature. To this end, the carrier wave from the corresponding one of the fourth and fifth paths is coupled to a first and a second side of the bridge network; and means introducing a phase reversal of the carrier wave in the second side of the bridge network with respect to the carrier wave in the first side of the bridge network is provided. In one embodiment, the phase reversal is effected by providing a coupling path to the input terminal on the second side which is a half wavelength longer than the coupling path to the input terminal of the bridge network on the first side. In another embodiment, this phase reversal is provided by inserting a transmission line in an arm of the bridge network on the second side which is a half wavelength longer than a transmission line in an arm of the bridge network on the first side.

The impedance bridge networks are capacitance bridge networks and are structurally realized by providing spaced, parallel stator plates having facing conductive patterns and a motor driven rotor positioned between these stator plates, the rotor having conductive patterns for varying the coupling between the facing conductive patterns of the stator plates at an audio frequency rate. The shape and size of the conductive patterns on the stator plates, the shape and number of the conductive patterns on the rotor, and the speed of rotation of the rotor are so selected that a sinusoidal audio frequency modulation of the capacitance between the facing conductive patterns of the stator plates is effected. Four conductive patterns are symmetrically arranged on each of the stator plates, and the conductive patterns on the rotor are pie-shaped with straight radial sides and are alternated with blank patterns of equal width. The stator plates and the rotor are formed of discs of dielectric material, and the conductive patterns are provided as coatings thereon. Conductive coatings are provided in pairs on opposite sides of the rotor dielectric disc with the opposed coatings being electrically connected and electrically isolated from other conductive patterns on the rotor disc.

The foregoing and other objects, advantages, and features of the invention and the manner in which the same are accomplished will become more readily apparent upon consideration of the following detailed description of the drawings, which illustrate preferred and exemplary embodiments.

BRIEF DESCRIPTION OF THE DRAWINGS

FIG. 4 is a schematic diagram showing the structural relationship between parts of a sideband generator;

FIG. 5 is a view, somewhat enlarged, taken along line 5—5 of FIG. 4;

FIG. 6 is a view, on the same scale as FIG. 5, taken along line 6—6 of FIG. 4;

FIG. 10 is a side elevation view of a structural realization of pair of sideband generators according to the invention;

FIG. 11 is a view taken along line 11—11 of FIG. 10;

FIG. 12 is a view taken along line 12—12 of FIG. 10;

FIG. 13 is a view taken along line 13—13 of FIG. 10; and

FIG. 14 is a view taken along line 14—14 of FIG. 10.

DETAILED DESCRIPTION

Figure 1:
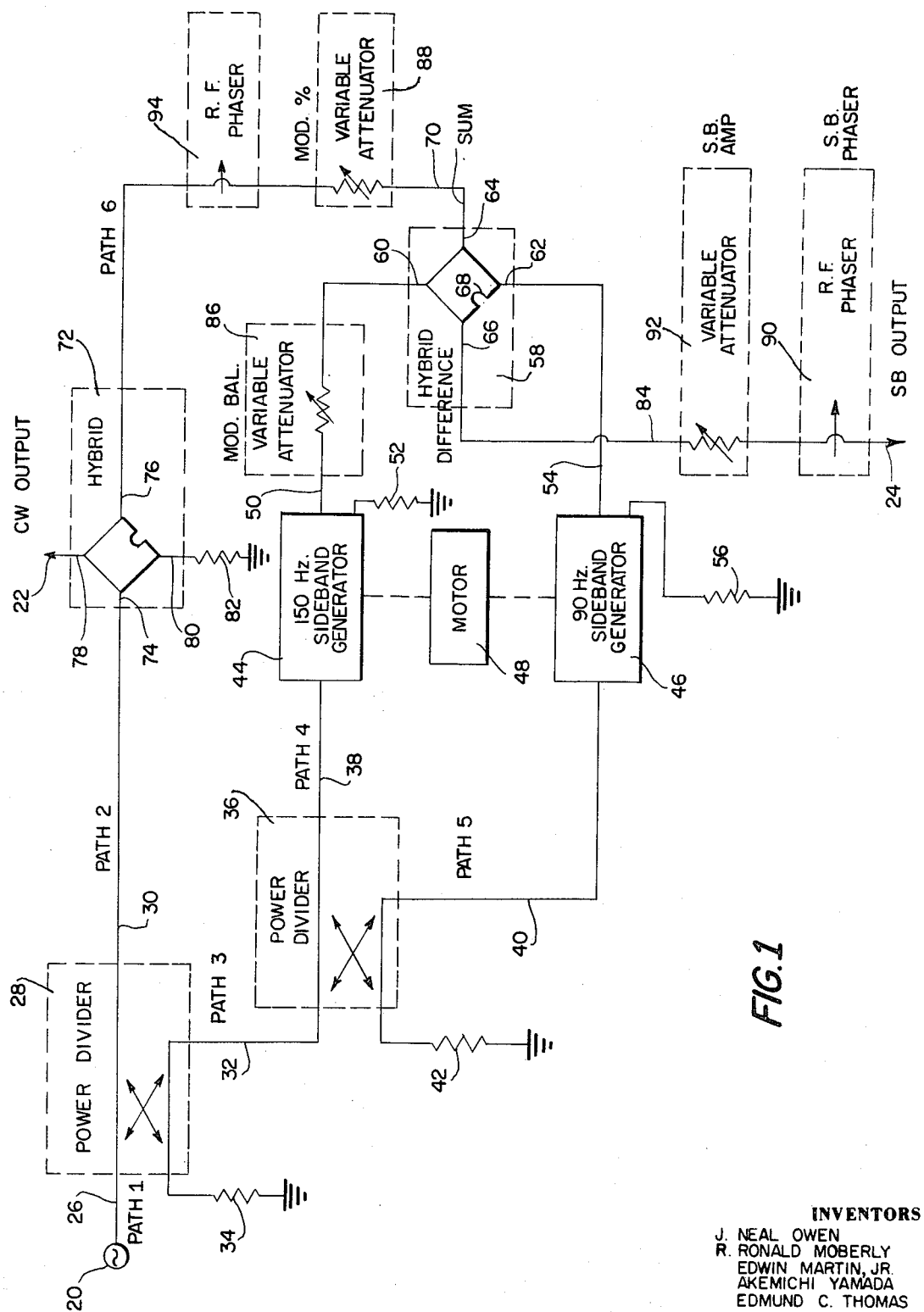
FIG. 1 is a schematic diagram of a modulator in accordance with the invention.

From the schematic diagram of FIG. 1, it will be apparent how the modulator of the present invention receives an unmodulated radio frequency carrier wave from a source 20 and provides a first CW (carrier wave) output at 22 and a second SB (sideband) output at 24. The unmodulated carrier wave from source 20 is applied to a transmission line 26 forming a first path (Path 1) and is divided in a power divider 28 and applied to a second path (Path 2) formed by transmission line 30 and a third path (Path 3) formed by transmission 32. It is to be understood that the power division ratio of power divider 28 is such that the desired depths of modulation can be obtained at CW output 22 and that the power divider should provide good isolation between Paths 2 and 3. While any power divider having the desired characteristics may be employed, a directional coupler with a 4.5 dB. coupling ratio has been found to be particularly suitable. It will be noted that one side of the directional coupler 28 is coupled to a terminating impedance 34 as is well known in the art.

The carrier wave in Path 3 is again divided by a second power divider 36 and applied to a fourth path (Path 4) formed by transmission line 38 and a fifth path (Path 5) formed by transmission line 40. It is important that power divider 36 provide good isolation between Path 4 and Path 5 in order to eliminate cross modulation between these paths. A power divider providing the requisite isolation can be realized in many forms, such as a ring hybrid, a branch-line hybrid, or a directional coupler. In the particular example shown, a directional coupler with a 3.6 dB. coupling ratio is utilized. As before, the directional coupler requires a terminating impedance 42 as shown.

Paths 4 and 5 feed two constant input impedance sideband generators 44 and 46, the power division ratio of power divider 36 being so selected that the desired power ratio between the two double sideband suppressed carrier signals provided by the sideband generators can be obtained. The use of constant input impedance sideband generators helps promote the elimination of cross modulation between Paths 4 and 5. As will be explained more fully hereinafter, sideband generator 44 is driven by a motor 48 to generate 150 Hz. double sideband suppressed carrier signals on transmission line 50, providing a similar signal to a loading resistor 52. Motor 48 also drives sideband generator 46 to generate 90 Hz. double sideband suppressed carrier signals on line 54, while providing similar signals to a loading resistor 56.

The double sideband suppressed carrier signals on lines 50 and 54 are then fed to a hybrid combining circuit 58. The 150 Hz. double sideband suppressed carrier signal on line 50 is applied to an input port 60 of the hybrid, while the 90 Hz. double sideband suppressed carrier signals on line 54 are connected to an input port 62 of the hybrid. In order to obtain an equal sideband power ratio at the sum output port 64 of the hybrid and the difference output port 66 thereof, a 3 dB. ring hybrid may be used. As is well known in the art, a hybrid of this type will typically include three one-quarter wave arms and a fourth arm having an effective length of three-quarter wave by virtue of the provision of a phase transition section 68. Thus, a sum signal will be provided from sum port 64 to a Path 6 formed by transmission line 70 and will contain the sum signals of the 90 Hz. and 150 Hz. double sideband suppressed carrier signals received from the sideband generators 44 and 46. The sum signal is coupled along Path 6 to a hybrid combining circuit 72 where it is combined with the carrier wave signal from Path 2. The carrier wave signal in Path 2 is connected to an input port 74, while the double sideband suppress carrier sum signal on Path 6 is coupled to an input port 76 of the hybrid. While hybrid 72 may be a ring hybrid of the same type as hybrid 58, it is not necessary that this hybrid be a 3 dB. hybrid; the coupling of the hybrid should be optimized to provide the maximum possible total output power. The CW output 22 is received from an output port 78 of hybrid 72 and will have a carrier wave component received from Path 2 and a double sideband component received from Path 6. The opposite output port 80 of the hybrid is connected to a balancing impedance 82.

The difference output from hybrid 58 received from output port 66 will contain the difference signal of the double sideband suppressed carrier 150 Hz. and 90 Hz. signals received from generators 44 and 46. This signal, in which the 150 and 90 Hz. sideband components will be of opposite phase, will be coupled along transmission line 84 to the SB output 24 providing the sideband only output signal thereto.

The modulator of the present invention is readily adjustable with respect to the modulation depth of the output signals, the relative amplitude of the output signals, the relative RF phase of the output signals, the relative amplitude of the sideband signals, the relative RF phase of the sideband signals, and the relative audio phase between the sideband signals as will be presently explained. A variable attenuator 86 may be placed in either Path 4 or Path 5, on either side of the sideband generator therein, to control the relative amplitude of the 90 Hz. and 150 Hz. double sideband suppressed carrier signals. This control may therefore be called a "modulation balance" control and, in the example shown in FIG. 1, is positioned in line 50 of Path 4. The range of this variable attenuator should be proportional to the range of modulation balance required at either of the outputs of the modulator. The depth of modulation at the CW output 22 can be controlled by a variable attenuator positioned in Path 2, Path 3, or Path 6. As shown, variable attenuator 88 is positioned in Path 6 for this purpose and may be referred to as the "modulation percentage" control. In order to control the relative RF phase between the CW output at 22 and the SB output at 24, a RF phaser may be positioned in the path to one of these outputs. As shown, RF phaser 90 is provided adjacent SB output 24. Since this phaser adjusts the phase of the sideband output, it may be referred to as the "SB phase" control. The relative amplitude between the sideband signals in the CW output at 22 and the sideband signals in the SB output at 24 can be best controlled by a variable attenuator in the path to SB output 24. Thus, a variable attenuator 92 is positioned in line 84 for this purpose and may be referred to as the "SB amplitude" control. In order to adjust the relative phase of the carrier signals in Path 2 and the double sideband suppressed carrier signals in Path 6, a RF phaser may be positioned in either Path 2 or Path 6. As shown, RF phaser 94 is positioned in line 70 of Path 6 for this purpose.

As already mentioned, the sideband generators 44 and 46 should have constant input impedance. To this end, it is necessary that they each provide two double sideband suppressed carrier output signals which are in audio quadrature. If two output signals have the forms:

$$E_1 = E_0 \cos W_s t \cos W_c t$$
$$E_2 = E_0 \sin W_s t \cos W_c t,$$

where $W_s$ is the angular frequency of the audio frequency modulation signal and $W_c$ is the angular frequency of the carrier wave, then the total power delivered to its two outputs is:

$$P_T = (E_1^2/R) + (E_2^2/R),$$

where $R$ is the loading resistance across the outputs, and $$P_T = \frac{(E_0 \cos W_s t \cos W_c t)^2}{R} + \frac{(E_0 \sin W_s t \cos W_c t)^2}{R}$$

$$P_T = \frac{(E_0 \cos W_c t)^2 (\cos^2 W_s t + \sin^2 W_s t)}{R}$$

$$P_T = \frac{(E_0 \cos W_c t)^2}{R}.$$

Thus, the total carrier wave power delivered to the two outputs of the sideband generator is constant and is not a function of the audio frequency modulation signals. Therefore, the sideband generator acts as a constant impedance load to radio frequency source 20.

Figure 2:
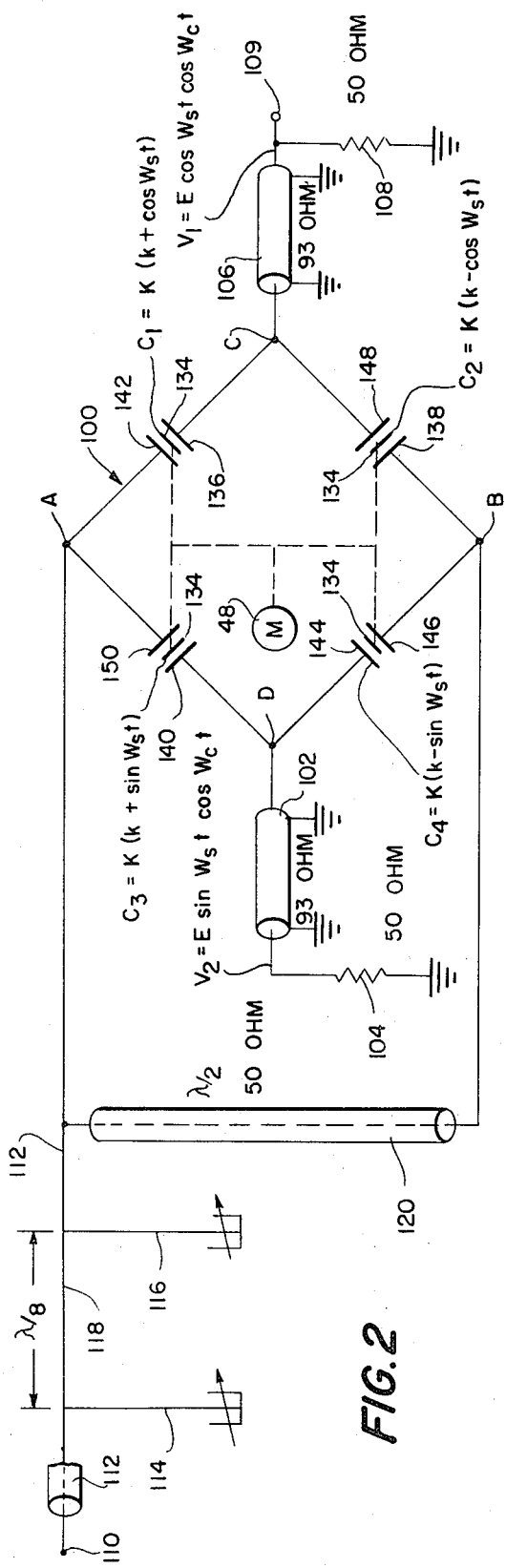
FIG. 2 is a schematic diagram of a first embodiment of sideband generator employed in the modulator of FIG. 1.
Figure 3:
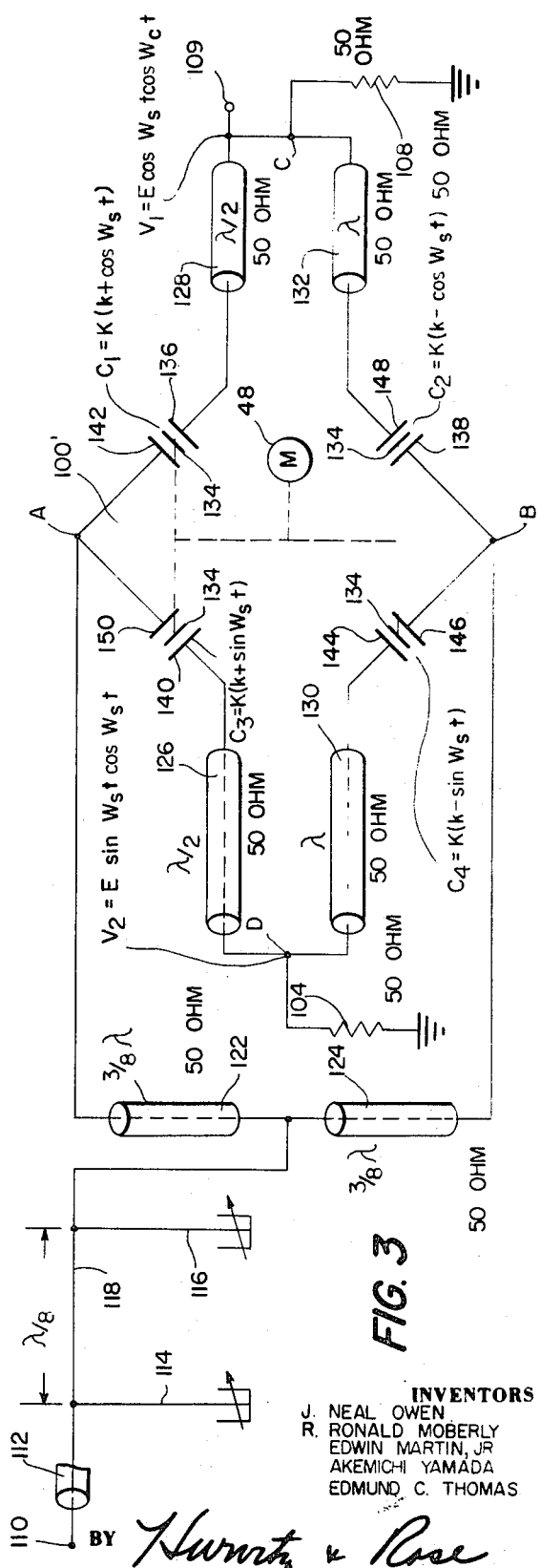
FIG. 3 is a second embodiment of sideband generator.

In order to realize the generation of double sideband suppressed carrier signals in audio quadrature as just discussed, four special variable capacitors $C_1$, $C_2$, $C_3$, $C_4$ are provided in a modified bridge configuration as shown in the embodiments of FIGS. 2 and 3. Referring to FIG. 2, it will be seen that in this embodiment equal amplitude but out-of-phase RF signals, $E_o \cos W_c t$ and $-E_o \cos W_c t$, are applied at the opposite input corners A and B of a capacitance bridge 100. The output signal at output corner C of the bridge will then be:

$$V_C = \frac{2KE_0 \cos W_s t \cos W_c t}{2K + \frac{1}{SR}}$$

and the output signal at the output corner D of the bridge will be:

$$V_D = \frac{2KE_0 \sin W_s t \cos W_c t}{2K + \frac{1}{SR}},$$

where $K$ is a coupling constant, $R$ is the loading resistance, and $S = j2 \pi f_c$, wherein $f_c$ is the frequency of the carrier wave. A 93 ohm transmission line impedance transformer is provided at each output corner of the bridge to present high loading resistance at the bridge outputs, transformer 102 being connected between corner D and a 50-ohm loading resistance 104 and transformer 106 being connected between corner C of the bridge and a 50-ohm loading resistance 108, which is connected between output terminal 109 of the sideband generators and ground. While the sideband generator will function properly when lines 102 and 106 are quarter wave lines, experience has shown that an optimum length of slightly less than one-eighth wavelength produces the best over-all efficiency.

Unmodulated carrier wave signals from the path corresponding to the sideband generator (Path 4 or Path 5 of FIG. 1) are fed from an input terminal 110 on a transmission line 112. An input impedance matching network is provided by means of two shorted variable stubs 114 and 116 separated by a one-eighth wavelength section 118 In order to provide the equal amplitude but out-of-phase RF signals to corners A and B of bridge 100, a one-half wavelength transmission line 120 is interposed in the path to corner B from line 112 providing a path which is one-half wavelength longer than the path to corner A. The carrier wave on one side of bridge 100 will thus be phase reversed with respect to the carrier wave on the other side of the bridge. The double sideband suppressed carrier signals produced at corner C of bridge 100 will be in the form:

$$V_1 = E_o \cos W_s t \cos W_c t,$$

and the output signal at the corner D of the bridge will in the form:

$$V_2 = E_o \sin W_s t \cos W_c t.$$

Since these signals have the requisite audio quadrature relationship, the constant input impedance will be provided as already explained.

FIG. 3 illustrates another way of accomplishing the same result. In this embodiment, the half-wave phase difference is provided in the arms of the bridge network instead of in the input leads thereto as in the case of the embodiment of FIG. 2. The unmodulated carrier wave is again received at input terminal 110 from the corresponding path (either Path 4 or Path 5) and is fed through transmission line 112 and an impedance matching section, comprising variable stubs 114 and 116 separated by one-eighth wavelength line section 118. Equal amplitude and in-phase RF signals, $E_o \cos W_c t$, are applied through ⅜-wavelength 50-ohm transmission line sections 122 and 124 to corners A and B of capacitance bridge 100'. The phase reversal on opposite sides of bridge 100' is provided by inserting half-wavelength 50-ohm transmission line sections 126 and 128 in bridge arms A–D and A–C on one side of bridge 100' and full-wavelength 50 ohm-transmission line sections 130 and 132 in bridge arms B–D and B–C on the opposite side of bridge 100'. It will again be noted that the bridge is terminated by means of loading resistances 104 at corner D and 108 at corner C.

Each of the capacitors, as will be shown in more detail hereinafter, comprises a pair of fixed plates and a movable rotor 134 therebetween for varying the coupling therebetween sinusoidally at an audio frequency rate. Thus, referring to both FIGS. 2 and 3, it will be noted that motor 48 is mechanically coupled to drive rotor 134 in a manner calculated to vary the capacitance of capacitors $C_1$, $C_2$, $C_3$, and $C_4$. Capacitor $C_1$ comprises a stator plate 142 connected to corner A of the bridge and a capacitor plate 136 connected to corner C of the bridge. As will be explained more fully hereinafter, the capacity $C_1$ of this capacitor will vary according to the equation $$C_1 = K (k + \cos W_s t),$$

where $K$ and $k$ are coupling constants. Capacitor $C_2$ includes stator plates 138 and 148, respectively connected to corners B and C of the bridge. Capacitor $C_2$ will vary according to the equation $$C_2 = K (k - \cos W_s t).$$

Capacitor $C_3$ comprises stator plates 150 and 140, respectively connected to corners A and D of the bridge and will vary according to the equation $$C_3 = K (k + \sin W_s t).$$

In like manner, capacitor $C_4$ comprises stator plates 146 and 144, which are respectively connected to corners B and D of the bridge. This capacitance varies upon rotation of the rotor according to the equation $$C_4 = K (k - \sin W_s t).$$

Figure 7:
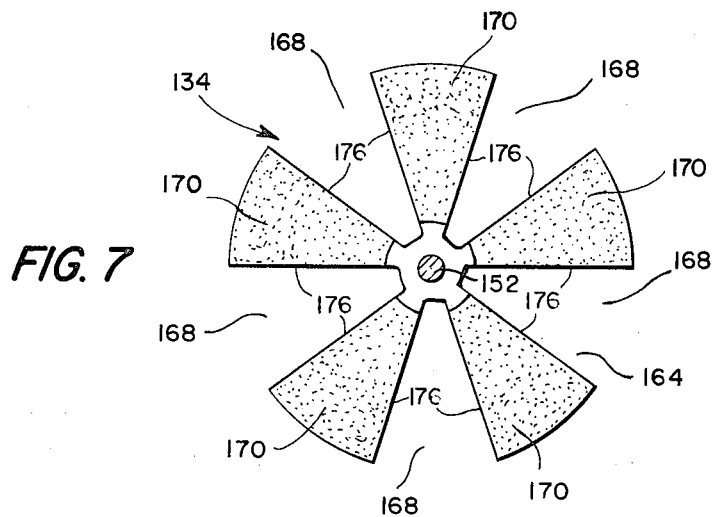
FIG. 7 is a view, on the same scale as FIG. 5, taken along line 7—7 of FIG. 4.
Figure 8:
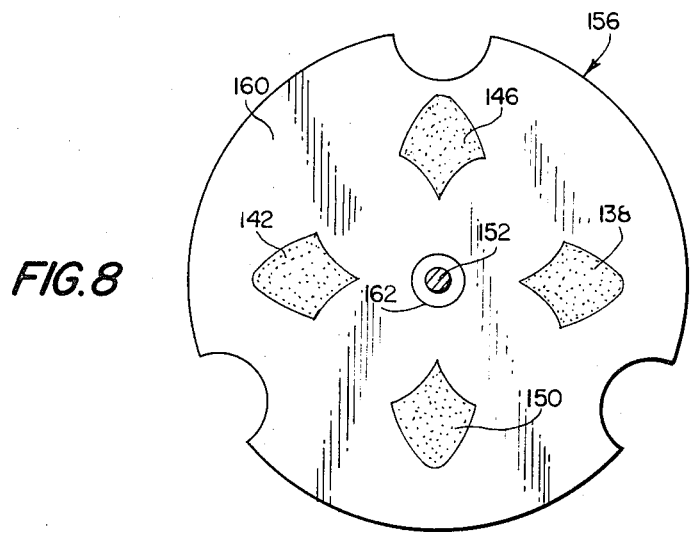
FIG. 8 is a view, on the same scale as FIG. 5, taken along line 8—8 of FIG. 4.
Figure 9:
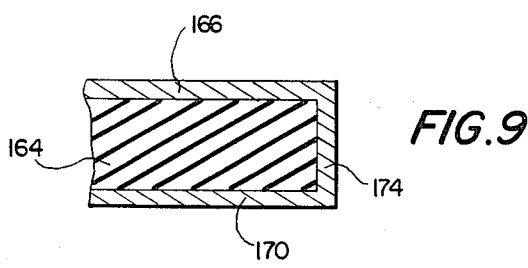
FIG. 9 is a partial sectional view taken along line 9—9 of FIG. 6.

The manner in which the four capacitors of the bridge are structurally realized will be apparent from FIGS. 4 through 14, inclusive. Turning first to the schematic diagram of FIG. 4, it will be noted that motor 48 drives a shaft 152 causing rotation of rotor 134 mounted on the end thereof. It will be noted that rotor 134 is positioned between and in parallel relation to a pair of spaced, parallel stator plates 154 and 156. From FIG. 5, it will be noted that stator plate 154 comprises a disc of dielectric ceramic material 158 upon one surface of which (the surface facing rotor 134) are located four conductive patterns forming stator plates 136, 148, 140, and 144 of capacitors $C_1$, $C_2$, $C_3$, and $C_4$, respectively. These conductive patterns are applied as silver deposited coatings on dielectric disc 158. Each of these patterns is positioned symmetrically about the center of the disc, being spaced every 90 degrees. Turning to FIG. 8, it will be noted that the stator plate 156 is also formed of a dielectric disc 160 and is also provided with four silver conductive patterns coated on a surface of the disc 160 facing rotor 134. It will be noted that the conductive patterns on stator plate 156 correspond to stator plates 138, 142, 146, and 150 of the capacitance bridge. Dielectric disc 160 is provided with a central opening 162 to accommodate the passage of shaft 152 of the rotor.

Rotor 134 as will be seen from FIGS. 6 and 7, also comprises a dielectric disc 164 having a plurality of conductive patterns of silver deposited thereon. These conductive patterns 166 on the side seen in FIG. 6 alternate with an equal number of blank patterns 168 of equal angular extent. Although blank patterns 168 may be provided by leaving corresponding locations on disc 164 uncoated, experience has shown that removal of the unclad portions of the disc, as shown, improves efficiency by reducing the minimum capacitance, giving a higher ratio of maximum to minimum capacitance. Turning to FIG. 7, it will be noted that the opposite side of rotor 134 has an equal number of conductive patterns 170 each of which is positioned directly opposed to a pattern 166 on the other side. Here, again, blank patterns 168 of equal angular extent and number are positioned alternately with conductive patterns 170. As will be seen from the section view of FIG. 9, patterns 166 and 170 on opposite sides of dielectric disc 164 are electrically connected by a conductive coating 174 bridging the edge of the disc. However, each of the conductive patterns is otherwise electrically isolated from the remainder of the conductive patterns on rotor 134. As will be apparent from an inspection of FIGS. 6 and 7, each of the conductive patterns is pie-shaped, having straight radial edges 176.

Referring particularly to FIG. 5, the manner in which the shape and size of the conductive patterns on the stator plates are arrived at will be explained. Each of the conductive patterns on the stator plates has three curved edges 178, 180, 182. Curved edge 178, which intersects curved edges 180 and 182 at corners 184 and 186 respectively, is governed by the polar function $$\rho_1 = a + h \cos n \phi,$$

while curved edges 180 and 182 which intersect each other at point 188 are governed by the polar function $$\rho_2 = a - h \cos n \phi .$$

In these functions, $a$ is the radius of the circle 190 connecting the corners 184 and 186 of each of the conductive patterns; $h$ is the radial distance between circle 190 and a circle 192 tangent to the midpoint of the curved edge 178 of each of the patterns; $n$ represents the number of conductive patterns on each face of rotor 134 and is governed by the equation $n = f_s/f_m$, where $f_s$ is the desired frequency of the audio frequency modulation and $f_m$ is the motor speed in cycles per second; and the angle $\phi = \pi/2n$, the angle $\pi/n$ or $2\phi$ being the angle subtended by the arc between corners 184 and 186 on circle 190. It will be noted from the rotor that it is divided into $2n$ sections, alternate one of which are conductive and blank.

As rotor 134 rotates at the speed $f_m$, the coupling between opposing conductive patterns of the two stators varies due to the variation of the over-lapping area between stator patterns and rotor patterns. The over-lapping area between a stator pattern and a rotor pattern varies as a function:

$$A = (2 \, ah/n) (1 - \cos(n \, W_s t + n \, \phi)).$$

Therefore, the coupling between a pair of facing stator patterns varies sinusoidally from its maximum to its minimum. It will be apparent from the foregoing that the shape and size of the conductive patterns on the stator plates, as governed by polar functions $\rho_1$ and $\rho_2$, the shape and number $n$ of the conductive patterns on the rotor, and the speed of rotation $f_m$ of the rotor are so selected that a sinusoidal audio frequency modulation of frequency $f_s$ of the capacitance between facing conductive patterns of the stators is effected. The sequence of coupling variation is such that if one pair varies as a function of $K$ ($k + \cos n \, W_s t$), then each successive pair varies as $K(k + \sin n \, W_s t)$, $K(k - \cos n \, W_s t)$, and $K (k - \sin n \, W_s t)$, respectively, in the direction of rotation.

One stator, in the example given, stator 156 of FIG. 8, is used as an input stator, and the other, stator 154 of FIG. 8, is used as an output stator. On the input stator, it will be noted that two adjacent patterns are fed together with corner A with identical RF signals ($E_o \cos W_c t$), and the other pair of two adjacent patterns are fed together from corner B with RF signals which are of equal amplitude and in-phase or out-of-phase with the signals from corner A depending on whether the embodiment of FIG. 2 or FIG. 3 is employed. Thus, referring to FIGS. 2, 3 and 8, corner A is connected to conductive patterns 142 and 150 which, as seen in FIG. 8 are adjacent patterns, while input corner B is connected to stator patterns 138 and 146 which, as seen in FIG. 8, are adjacent patterns. On the output stator, one output is taken by connecting to a pair of patterns which are located 180° apart, and the other output is taken by connecting to the other pair of patterns. Referring to FIGS. 2, 3 and 5, it will be noted that output terminal C is connected to patterns 136 and 148 which are diametrically opposite patterns; and output terminal D is connected to stator plates 140 and 144 which are the other pair of diametrically opposed patterns. Double sideband suppressed carrier signals in audio quadrature will be provided at terminals C and D as has been explained hereinabove.

Since both 90 Hz. and 150 Hz. double sideband suppressed carrier signals are required, it is convenient to drive both generators 44 and 46 with a common motor 48 in the manner shown in FIG. 10. An assembly 200 including the rotor and two stators for the 90 Hz. sideband generator is mounted at one end of motor 48, and an assembly 202 of the rotor and two stators for the 150 Hz. sideband generator is mounted on the other end of the motor. Because each of these assemblies is substantially identical, differing only in the design of conductive patterns required to produce the 90 and 150 Hz. modulations, assembly 200 will be described in detail herein, it being understood that assembly 202 contains like parts cooperating in a like manner. It will be noted that synchronous motor 48 is coupled by means of stainless steel flexible couplings 204 and 206 through double shielded precision ball-bearings 208 with rotor shafts 152 and that bearings 208 are clamped by clamps 210 to standards 212 upstanding from a motor base 214. Rotor 134 is fastened to a precision machine stainless steel hub 216 being locked thereon by means of a lock nut 218. The rotor must run in a plane which is parallel and equidistant to each stator without wobble which would cause a degradation of the electrical performance. Stator 154 is mounted on three mounting studs 220 projecting from a base plate 222 with 120° spacing and is sandwiched between compression springs 224 and expansion washers 225 retained by lock nuts 226. Studs 220 are threaded, permitting the gap between stator 154 and rotor 134 to be adjustable to accommodate environmental changes and permitting easy adjustment during assembly. The free ends of studs 220 have a head 228 bearing against an end of spring 224.

Stator plate 156 is similarly mounted on three studs 230 projecting from plate 222. It will be noted that studs 230 are symmetrically arranged at 120°-intervals, studs 230 being positioned midway between adjacent studs 220. Stator plate 156 is also adjustable axially of rotor shaft 152 to adjust the gap between stator 156 and rotor 134. To this end, lock nuts 232 are threaded on studs 230 at one side of stator plate 156, the other side of which is engaged by compression springs 234 mounted on studs 230. Since stator plate 156 would otherwise be in a position to block studs 220, it is provided with cut-outs 223 at positions corresponding to the positions of studs 220.

It will be noted that base plate 222 is, in turn, mounted on a mounting plate 236 which is supported by the housing of bearing 208. Plate 222 is secured to plate 236 by means of set screws 238 (see FIG. 14) which ride in slots 240 permitting angular adjustment of the two stator plates of assembly 200 relative to assembly 202. Thus, angular adjustment of a sideband generator can be accomplished with the motor running. This provides a very convenient method of adjusting audio phase. Alternatively, the phase relationship between assembly 200 and assembly 202 may be effected by loosening the clamp 210 associated with assembly 200, and rotating assembly 200 in its entirety relative to assembly 202. In addition, with the motor not running, it is possible to adjust the relative angular position of rotors 134, by loosening a clamp screw (not shown) retaining flexible coupling 204 to shaft 152. In order to protect the generator, a housing 244 is provided and may be secured to mounting plate 236 by appropriate fastening means (not shown).

In order to construct a sideband generator which is stable over the required service conditions, the selection of the dielectric material used on the rotors and stators is very critical. A few of the characteristics to be considered in selecting the dielectric material are: excellent dimensional stability, low thermal expansion, high moduli at elevated temperature, stable dielectric constant, low electrical loss tangent, low specific gravity, and machinability. Among many available dielectric materials, Ceramoplastic, such as Supramica 500 as manufactured by Mycalex Corp. of America, has been found to be the most ideal material. The conductive patterns on the rotors and stators must have a high bond strength. For this reason, silver depositing techniques are used.

Because degradation of the electrical performance occurs with small changes in the distance separating rotor 134 from stators 154 and 156, it is desirable to construct the assemblies in such a manner that the effects of expansion and contraction are nullified, so far as the rotor and stator spacing is concerned. This is accomplished by arranging expansion and contraction to occur from a datum plane $x$ (see FIG. 10) and by providing essentially equal length paths (varying only by the small amount of the spacing between rotor 134 and stators 154 and 156) of identical materials between the datum plane and the mating surfaces of rotor 134 and stators 154 and 156. With reference to FIG. 10, assembly 200, shaft 152 is bearing in 208 such that changes in the length of shaft 152 occurring to the right of datum plane $x$ are absorbed by compression or extension of coupling 204. Changes in the length of shaft 152 occurring to the left of datum plane $x$ cause the faces of rotor 134 to move to the left or right by small distances.

The compensation will now be explained with reference to expansion only, it being understood that contraction will be the converse. As expansion takes place, the right hand face of rotor 134 will be moved to the left. The mating face of stator 156 is also moved to the left because it is held in contact with nut 232 by spring 234. The expansion of shaft 152 and support studs 230 for stator 156 are the same, since nut 232 is positioned at essentially the same distance from datum plane $x$ as the portion of shaft 152 under consideration, and because the support studs 230 for stator 156 and shaft 152 are of the same material. The left hand face of rotor 134 moves to the left by the same amount as the right hand face plus the expansion of rotor 134 in the axial direction. The mating face of the stator 154 is moved to the left a corresponding amount, because it is held in contact with expansion washer 225 by spring 224. The expansion of shaft 152 plus the expansion of rotor 134 and the expansion of studs 220 plus that of expansion washer 225 are the same, since the two paths contain the same materials in essentially the same proportions.

In order to hold stators 154 and 156 accurately in a rotational sense about the main axis (axis of shaft 152), the fit between stators 154 and 156 and their supports 220 and 230 supporting stator 156, must be close yet stators 154 and 156 must be free to translate axially to accomplish the compensation previously described. To insure this freedom of movement support studs 220 and 230 for stators 154 and 156 are carried on plate 222 which is of a material matching the expansion rate of stators 154 and 156; in fact, it could be of the same material.

The environmental parameters imposed on the sideband generators are such that the selection of materials with compatible physical properties is essential. The materials must be compatible with each other and with the intended environment. It has been possible, for example, to design the equipment to operate with a limited degradation of performance in any combination of $-10°$ C. to $+50°$ C. and a relative humidity range of 5 to 90 percent. The structural arrangement disclosed, provides a gap between rotor and stator which is infinitely adjustable within a specified range, and maintains the gap through the environmental range without exceeding performance tolerances. The structural material used in the sideband generator, where compatibility of materials is important, is a non-magnetic stainless steel.

While preferred embodiments of the invention have been shown and described, it will be apparent to those skilled in the art that changes can be made without departing from the principles and spirit of the invention the scope of which is defined in the appended claims.

The invention claimed is:

1. In a modulator for instrument landing systems, a first path adapted to receive a radio frequency carrier wave; first power divider means for dividing the power of said carrier wave in said first path between a second path and a third path while maintaining isolation between said second path and said third path; second power divider means for dividing the power of said carrier wave in said third path between a fourth path and a fifth path while maintaining isolation between said fourth path and said fifth path; first constant input impedance sideband generator means modulating said carrier wave at a first audio frequency in said fourth path; and second constant input impedance sideband generator means modulating said carrier wave at a second audio frequency in said fifth path.

2. A modulator for instrument landing systems, comprising a first path adapted to receive a radio frequency carrier wave; first power divider means for dividing the power of said carrier wave in said first path between a second path and a third path while maintaining isolation between said second path and said third path; second power divider means for dividing the power of said carrier wave in said third path between a fourth path and a fifth path while maintaining isolation between said fourth path and said fifth path; first constant input impedance sideband generator means modulating said carrier wave at a first audio frequency in said fourth path; and second constant input impedance sideband generator means modulating said carrier wave at a second audio frequency in said fifth path, wherein said sideband generator means provide double sideband suppressed carrier signals and said modulator further comprises first means to combine the outputs of said sideband generator means and provide a difference output as a sideband only output of said modulator and a sum output in a sixth path and second means to combine said sum output with the carrier wave in said second path and provide a carrier wave output of said modulator.

3. A modulator as recited in claim 2, wherein one of said fourth and fifth path comprises variable attenuator means to control the relative amplitudes of said double sideband suppressed carrier signals and wherein one of said second path, third path, and sixth path comprises attenuator means to control the depth of modulation of said carrier wave output.

4. A modulator as recited in claim 3, further comprising attenuator means coupled to one of said outputs of said modulator to control the relative amplitudes of said outputs and phase shift means coupled to one of said outputs of said modulator to control the relative phase of said outputs.

5. A modulator as recited in claim 2, wherein each of said sideband generators comprises an impedance bridge network, means to vary impedances in said bridge network at a rate introducing an audio frequency modulation, means coupling the carrier wave from the corresponding one of said fourth and fifth paths to a first and a second side of said bridge network, and means introducing a phase reversal of said carrier wave in said second side of said bridge network with respect to said carrier wave in said first side of said bridge network.

6. A modulator as recited in claim 5, wherein said means introducing a phase reversal comprises a path from said corresponding path to an input terminal of said bridge network on said second side which is one-half wavelength longer than the path from said corresponding path to an input terminal of said bridge network on said first side.

7. A modulator as recited in claim 5, wherein said means introducing a phase reversal comprises a transmission line in an arm of said bridge network on said second side which is a half wavelength longer than a transmission line in an arm of the bridge network on said first side.

8. A modulator as recited in claim 2, wherein each of said sideband generators comprises a capacitance bridge network and motor means modulating the capacitance of the capacitors of said bridge network at an audio frequency rate.

9. A modulator as recited in claim 8, wherein the capacitors of said capacitance bridge network comprise spaced, parallel stator plates having facing conductive patterns and said motor drives a rotor between said stator plates, said rotor having conductive patterns for varying the coupling between said facing conductive patterns of said stator plates at said audio frequency rate.

10. A modulator as recited in claim 9, wherein the shape and size of said conductive patterns on said stator plates, the shape and number of said conductive patterns on said rotor, and the speed of rotation of said rotor are so selected that a sinusoidal audio frequency modulation of the capacitance between said facing conductive patterns of said stator plates is effected.

11. Modulator means for an instrument landing system, comprising first power divider means for dividing a radiofrequency carrier wave into first and second portions; second power divider means for dividing said second carrier wave portion into third and fourth portions; separate sideband generator means including a pair of constant input impedance sideband generators means having respectively different operating frequencies for separately modulating said third and fourth carrier wave portions to produce first and second double sideband suppressed carrier signals of higher and lower frequency, respectively; first combining circuit means for producing signals responsive to the sum and difference of said first and second double sideband suppressed carrier signals, respectively; second combining circuit means for combining said first carrier wave portion with said sum signal of said first and second double sideband suppressed carrier signals to supply as a first output signal an amplitude modulated carrier wave signal; and output circuit means connected with said first combining circuit means for supplying as a second output signal said difference signal of said first and second double sideband suppressed carrier signals.

12. Apparatua as defined in claim 11, and further including modulation balance control means comprising variable attenuator means connected with one of said sideband generator means for controlling the relative amplitudes of said double sideband suppressed carrier signals.

13. Apparatus as defined in claim 11, and further including means for controlling the depth of modulation of said first output signal, comprising variable attenuator means connected in at least one of the circuit paths between said first power divider means and said second combining circuit, said first combining circuit and said second combining circuit, and said first power divider means and said second power divider means, thereby controlling at least one of the inputs of said second combining circuit and said second power divider means.

14. A source of carrier wave, a first power divider having an input terminal connected to said source of carrier wave, said first power divider having two output paths, a second power divider responsive to signal in one of said two output paths, said second power divider having two further output paths, a first mechanically driven capacitive bridge sideband modulator connected in one of said further paths, a second mechanically driven capacitive bridge sideband modulator connected in the other of said further paths, said sideband modulators being arranged to modulate carrier signal in said paths at respectively different audio frequencies to produce suppressed carrier sideband signal energies, means for combining said sideband signal energies to form sum and difference sideband signals in separate paths, hybrid combiner means for combining said sum sideband signals with carrier in one of said first mentioned output paths, and means for transmitting signal derived from said hybrid combiner in one path and said difference sideband signals in another path.

15. The combination according to claim 14, wherein said first and second power dividers are directional couplers having each a direct and a coupled path.

16. The combination according to claim 14, wherein is provided means for adjusting the relative amplitudes of said suppressed carrier sideband energies, and the relative amplitudes and phases of said carrier signal relative to said suppressed carrier sideband energies.

17. In an aircraft landing pattern transmitter, a source of unmodulated carrier wave, a first directional coupler connected directly in cascade with said source, said first directional coupler being arranged to divide the energy of said carrier wave into two first paths, a second directional coupler having an input port connected in one of said paths and having two second output ports, separate audio modulators connected directly in cascade with said two output ports, respectively, said modulators being adapted to have constant input impedances over a modulation cycle and to generate carrier suppressed double sideband signals, said modulators including only passive circuit elements.

18. The combination according to claim 17, wherein said modulators are motor driven balanced bridge modulators.

19. The combination according to claim 17, wherein said modulators are motor driven capacitor bridge modulators.

20. The combination according to claim 17, wherein is provided solely passive means for deriving the sum and the difference of said carrier suppressed double sideband signals in separate paths, solely passive means for combining said difference with the carrier wave in said other of said first paths to form a combined signal, means for transmitting said combined signal, and means for transmitting said sum signal.

21. The combination according to claim 36, wherein is provided solely passive means for deriving the sum and the difference of said carrier suppressed double sideband signals in separate paths, solely passive means for combining said difference with the carrier wave in said other of said first paths to form a combined signal, means for transmitting said combined signal, and means for transmitting said sum signal.

22. The combination according to claim 17, wherein all paths from said source of unmodulated carrier wave to said means for transmitting said combined signal and said means for transmitting said sum signal include only wholly passive circuit elements.

23. In an instrument landing system for aircraft, a source of carrier wave, means including only passive elements for dividing the power of said carrier wave into three separate paths which are mutually isolated from each other electrically, two passive element modulation systems connected respectively in first and second of said paths for forming carrier suppressed double sidebands of two discrete sideband frequencies, two circuit elements for combining said carrier suppressed double sidebands with said carrier respectively additively and subtractively.

24. The combination in accordance with claim 23, wherein the first recited means consists of two directional couplers connected in cascade.

* * * * *